(12) United States Patent
Uchino et al.

(10) Patent No.: US 12,204,722 B2
(45) Date of Patent: Jan. 21, 2025

(54) SENSOR AND A DRIVING METHOD THEREOF

(71) Applicant: Samsung Display Co., Ltd., Yongin-Si (KR)

(72) Inventors: Satoshi Uchino, Yokohama (JP); Kazuhiro Matsumoto, Yokohama (JP); Masahiko Takiguchi, Yokohama (JP)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/367,535

(22) Filed: Sep. 13, 2023

(65) Prior Publication Data

US 2024/0211074 A1 Jun. 27, 2024

(30) Foreign Application Priority Data

Dec. 23, 2022 (KR) ........................ 10-2022-0182806

(51) Int. Cl.
*G06F 3/041* (2006.01)
*G06F 3/044* (2006.01)
*G06F 3/046* (2006.01)

(52) U.S. Cl.
CPC ........ *G06F 3/04182* (2019.05); *G06F 3/0446* (2019.05)

(58) Field of Classification Search
USPC ........................................................ 345/174
See application file for complete search history.

(56) References Cited

U.S. PATENT DOCUMENTS

| 9,727,181 | B2 | 8/2017 | Goudarzi |
| 9,939,966 | B2 | 4/2018 | Bulea |
| 9,965,105 | B2 | 5/2018 | Hoch et al. |
| 10,282,021 | B2 | 5/2019 | Ramakrishnan |
| 2012/0262193 | A1* | 10/2012 | Wu .......................... G06F 3/044 324/679 |

(Continued)

FOREIGN PATENT DOCUMENTS

| JP | 2012-198607 | 10/2012 |
| KR | 10-1953319 | 3/2019 |

OTHER PUBLICATIONS

Shih-Hsuan Huang et al., "Influence of Low Ground Mass and Moisture Touch in On-Cell Touch with Foldable AMOLED", New Display Technology Development Center, AU Optronics Corp., SID 2020 DIGEST.

(Continued)

*Primary Examiner* — Chineyere D Wills-Burns
(74) *Attorney, Agent, or Firm* — F. CHAU & ASSOCIATES, LLC

(57) ABSTRACT

A sensor including: a sensor layer including a first electrode and a second electrode; a signal detection circuit configured to convert a sensing signal received from the sensor layer into data; a signal state detector configured to detect a state of the sensing signal based on the data; a signal restorer configured to output restoration data by restoring the data depending on the state of the sensing signal; and a coordinate calculator configured to calculate coordinates corresponding to the sensing signal based on the data or the restoration data, wherein the signal restorer restores the data into the restoration data by using a 2-dimensional (2D) normal distribution waveform.

20 Claims, 15 Drawing Sheets

(56) References Cited

U.S. PATENT DOCUMENTS

| | | | |
|---|---|---|---|
| 2014/0176493 A1* | 6/2014 | Ahn | G06F 3/0447 |
| | | | 345/174 |
| 2014/0184561 A1* | 7/2014 | Kim | G06F 3/0445 |
| | | | 345/174 |
| 2015/0002428 A1* | 1/2015 | Shin | G06F 1/3218 |
| | | | 345/173 |
| 2015/0138143 A1* | 5/2015 | Ichikawa | G06F 3/045 |
| | | | 345/174 |
| 2015/0248187 A1* | 9/2015 | Takahashi | G06F 3/04883 |
| | | | 345/174 |
| 2015/0268793 A1 | 9/2015 | Vandermeijden | |
| 2016/0274729 A1* | 9/2016 | Mori | G06F 3/0443 |
| 2017/0308195 A1* | 10/2017 | Huang | G06F 3/04182 |
| 2018/0121021 A1* | 5/2018 | Yu | G06F 3/044 |
| 2020/0302581 A1* | 9/2020 | Pan | G06F 17/16 |
| 2021/0152277 A1* | 5/2021 | Hwang | H04L 69/04 |
| 2023/0400486 A1* | 12/2023 | Nakagawa | G01R 23/02 |

OTHER PUBLICATIONS https://www.chip1stop.com/sp/interview/onsemi_touch-sensor (in English).

https://www.macnica.co.jp/business/semiconductor/articles/texas_instruments/119921/ (in English).

https://www.youtube.com/watch?v=zwz7wGliPG8 (with screenshots of introductions and ending).

\* cited by examiner

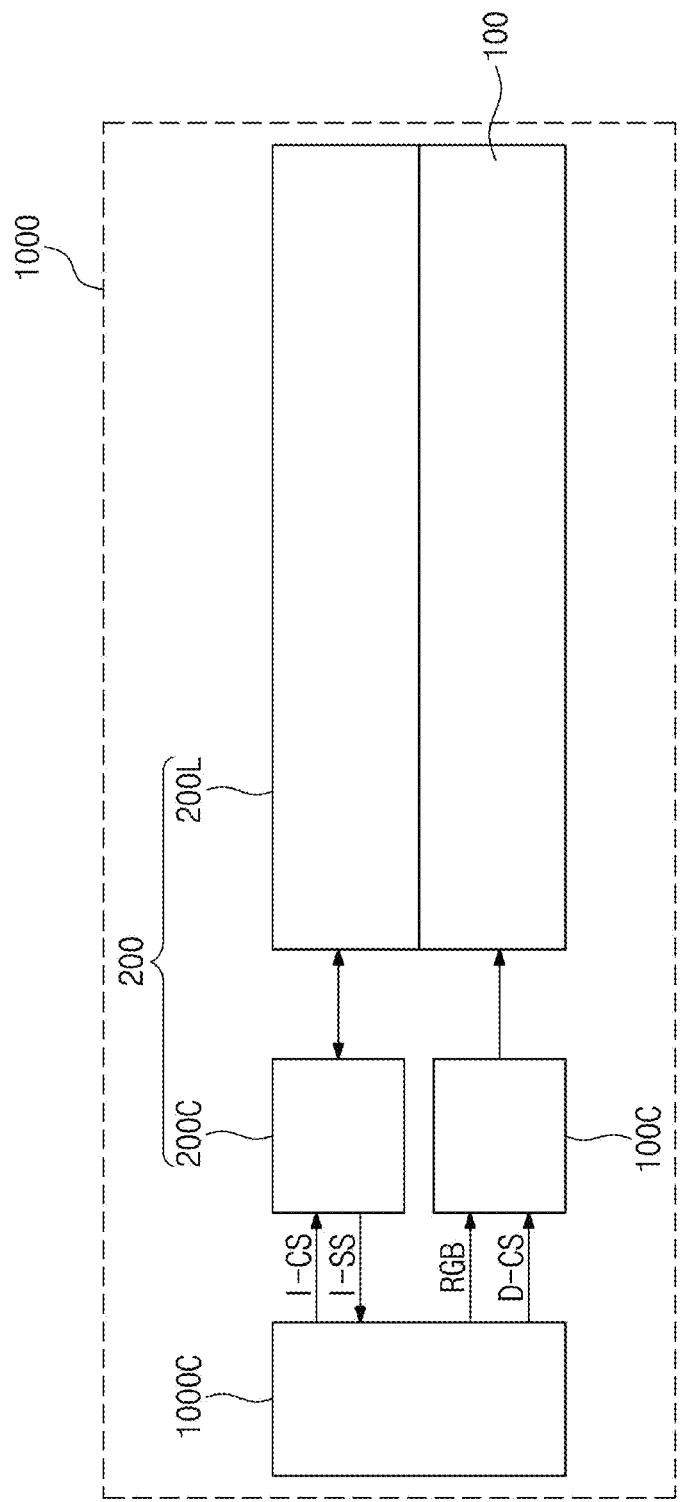

SENSOR AND A DRIVING METHOD THEREOF

CROSS-REFERENCE TO RELATED APPLICATION

This application claims priority under 35 U.S.C. § 119 to Korean Patent Application No. 10-2022-0182806 filed on Dec. 23, 2022, in the Korean Intellectual Property Office, the disclosure of which is incorporated by reference herein in its entirety.

TECHNICAL FIELD

Embodiments of the present disclosure described herein relate to a sensor having enhanced sensing performance and a driving method thereof.

DISCUSSION OF RELATED ART

Multimedia electronic devices including TVs, mobile phones, tablet personal computers (PCs), navigation systems, game consoles, automotive display devices, and the like, are capable of displaying images. Apart from general input methods such as buttons, keyboards, and mice, these multimedia electronic devices also offer touch-based input methods that allow users to input information or commands in a user-friendly and intuitive manner.

SUMMARY

Embodiments of the present disclosure provide a sensor having enhanced sensing performance and a driving method thereof.

According to an embodiment of the present disclosure, there is provided a sensor including: a sensor layer including a first electrode and a second electrode; a signal detection circuit configured to convert a sensing signal received from the sensor layer into data; a signal state detector configured to detect a state of the sensing signal based on the data; a signal restorer configured to output restoration data by restoring the data depending on the state of the sensing signal; and a coordinate calculator configured to calculate coordinates corresponding to the sensing signal based on the data or the restoration data, wherein the signal restorer restores the data into the restoration data by using a 2-dimensional (2D) normal distribution waveform.

The signal restorer includes: a first filter configured to generate first intermediate data by removing noise from the data; a center position calculator configured to calculate a center position from the first intermediate data; a second filter configured to generate second intermediate data by reflecting an accumulation value to the first intermediate data, and a calculator configured to generate the restoration data by calculating the 2D normal distribution waveform with the second intermediate data.

The calculator generates the restoration data by matching the second intermediate data with a center position of the 2D normal distribution waveform and multiplying the second intermediate data and the 2D normal distribution waveform.

The second filter is an infinite impulse response (IIR) time filter.

The second filter outputs the second intermediate data by mixing the first intermediate data and the accumulation value at a predetermined ratio.

The predetermined ratio is "a:(1-a)", and the 'a' is a value that is not less than '0' and is not greater than 0.9.

The signal restorer further includes an offset adjustor configured to adjust an offset of the first intermediate data and to provide the adjusted offset to the second filter.

The signal restorer further includes a third filter configured to remove noise from the restoration data by using a peripheral signal for the restoration data.

The signal restorer further includes a gain corrector configured to adjust a gain of the restoration data.

The signal state detector is configured to update a statistical value obtained from raw data, which is obtained by measuring a mutual capacitance between the first electrode and the second electrode.

The statistical value includes an average value of the raw data, a maximum value of the raw data, a minimum value of the raw data, or a standard deviation of the raw data.

The sensor layer is divided into a plurality of areas, and the statistical value is classified and stored for each of the plurality of areas.

The signal state detector is configured to determine a state of the data by comparing the data with at least one boundary value determined based on the statistical value.

The at least one boundary value is updated.

The signal state detector is configured to determine a state of the data by using artificial intelligence-based image recognition and classification technology.

The state of the sensing signal is divided into a first state requiring restoration and a second state not requiring restoration, and the 2D normal distribution waveform is generated by the data of the second state.

A maximum range and a minimum range of the data of the second state are calculated, and the data of the second state is quantized such that the maximum range is equal to a size of the data of the first state, wherein an average u and a variance ($\sigma x^2$, $\sigma y^2$) in x and y directions are calculated in a quantized 2D data, and the 2D normal distribution waveform is generated by using the average u and the variance ($\sigma x^2$, $\sigma y^2$) in the x and y directions based on Equation 1:

$$f(\vec{x}) = \frac{1}{\sqrt{(2\pi)^n |\Sigma|}} \exp\left\{-\frac{1}{2}(\vec{x}-\vec{\mu})^t \Sigma^{-1} (\vec{x}-\vec{\mu})\right\}, \quad \text{[Equation 1]}$$

and
wherein, in Equation 1, the 'n' is 2, covariance matrix $\Sigma$ is "[[$\sigma x^2$, $\sigma xy$], [$\sigma xy$, $\sigma y^2$]]", and the $\sigma xy$ is a covariance of 'xy'.

The sensor layer is divided into a plurality of areas, and the 2D normal distribution waveform is classified and stored for each of the plurality of areas.

According to an embodiment of the present disclosure, there is provided a driving method of a sensor, the method including: converting a received sensing signal into data; detecting a state of the sensing signal based on the data; generating restoration data by restoring the data depending on the state of the sensing signal; and calculating coordinates corresponding to the sensing signal based on the data or the restoration data, wherein the generating of the restoration data includes: generating the restoration data by using a 2D normal distribution waveform.

The generating of the restoration data includes: generating first intermediate data by removing noise from the data; calculating a center position from the first intermediate data; generating second intermediate data by mixing the first intermediate data and an accumulation value at a ratio of "a:(1-a)", wherein 'a' is not less than '0' and is not greater than 0.9; and matching the second intermediate data with a center position of the 2D normal distribution waveform and multiplying the second intermediate data and the 2D normal distribution waveform to generate the restoration data.

BRIEF DESCRIPTION OF THE DRAWINGS

The above and other features of the present disclosure will become apparent by describing in detail embodiments thereof with reference to the accompanying drawings.

FIG. 3 is a block diagram of an electronic device, according to an embodiment of the present disclosure.

DETAILED DESCRIPTION OF THE EMBODIMENTS

Figure 1A:
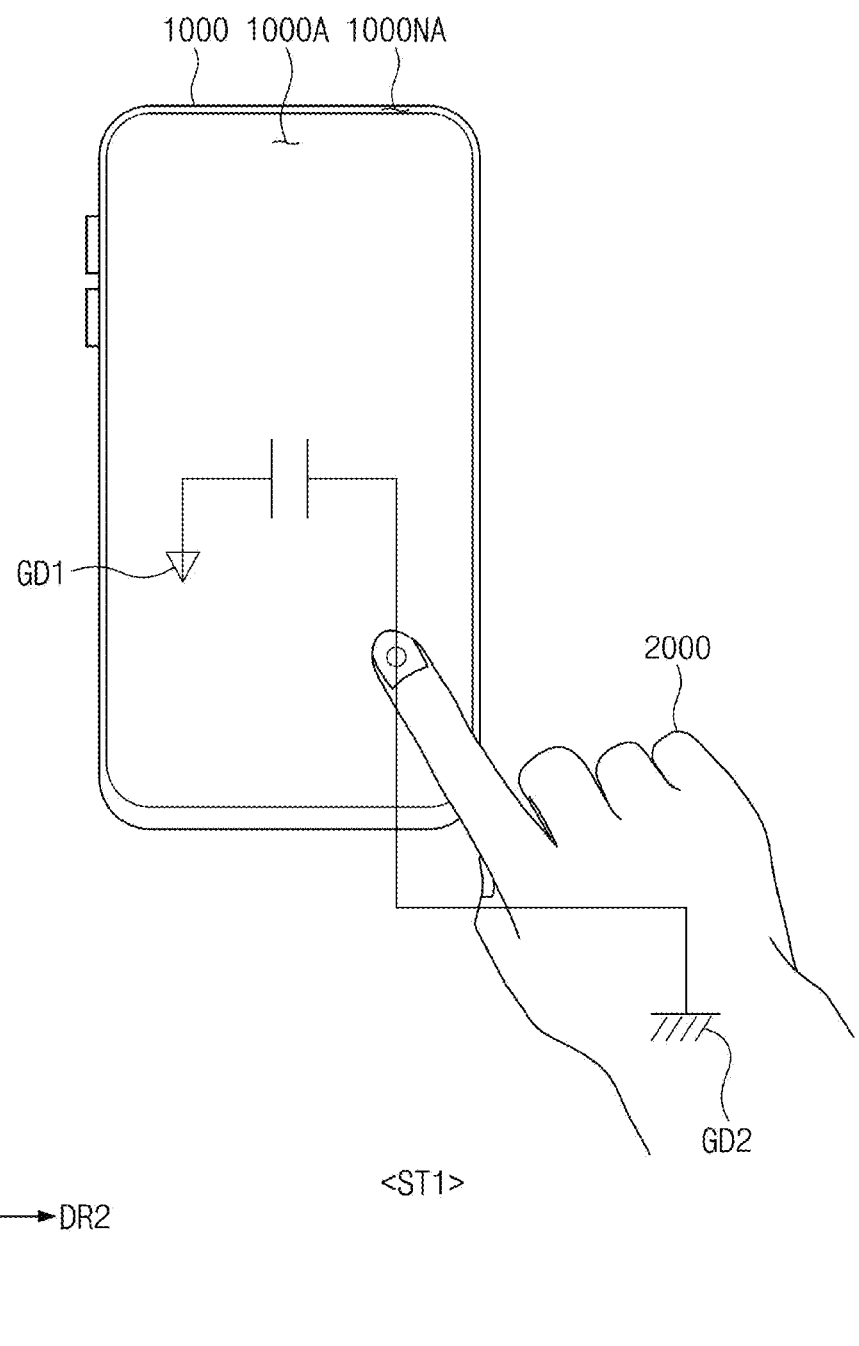
FIG. 1A is a diagram illustrating a use state of an electronic device, according to an embodiment of the present disclosure.

In this specification, the expression that a first component (or region, layer, part, portion, etc.) is "on", "connected with", or "coupled with" a second component may mean that the first component is directly on, connected with, or coupled with the second component or may mean that a third component is interposed therebetween.

The same reference numerals may refer to the same components. Additionally, in drawings, the thickness, ratio, and dimension of components may be exaggerated for an effective description of the technical contents illustrated therein. The term "and/or" includes one or more combinations in each of which associated elements are defined.

Although the terms "first", "second", etc. may be used to describe various components, the components should not be construed as being limited by these terms. These terms are used to distinguish one component from another component. For example, a first component may be referred to as a second component, and similarly, the second component may be referred to as the first component. The articles "a," "an," and "the" are singular in that they have a single referent, but the use of the singular form in the specification should not preclude the presence of more than one referent.

Additionally, the terms "under", "below", "on", "above", etc. are used to describe the correlation of components illustrated in the drawings. The terms that are relative in concept are described based on a direction shown in the drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

The terms "part" and "unit" may refer to a software component or hardware component that performs a specific function. For example, the hardware component may include a field-programmable gate array (FPGA) or an application-specific integrated circuit (ASIC). The software component may refer to executable codes and/or data used by the executable codes in an addressable storage medium. Accordingly, the software components may be, for example, object-oriented software components, class components, and task components, and may include processes, functions, attributes, procedures, subroutines, program code segments, drivers, firmware, microcodes, circuits, data, databases, data structures, tables, arrays, or variables.

Unless otherwise defined, all terms (including technical terms and scientific terms) used in the specification have the same meaning as commonly understood by one skilled in the art to which the present disclosure belongs. Furthermore, terms such as terms defined in commonly used dictionaries should be interpreted as having a meaning consistent with their meaning in the context of the related technology, and should not be interpreted to have ideal or overly formal meanings unless explicitly defined herein.

Hereinafter, embodiments of the present disclosure will be described with reference to the accompanying drawings.

Figure 1B:
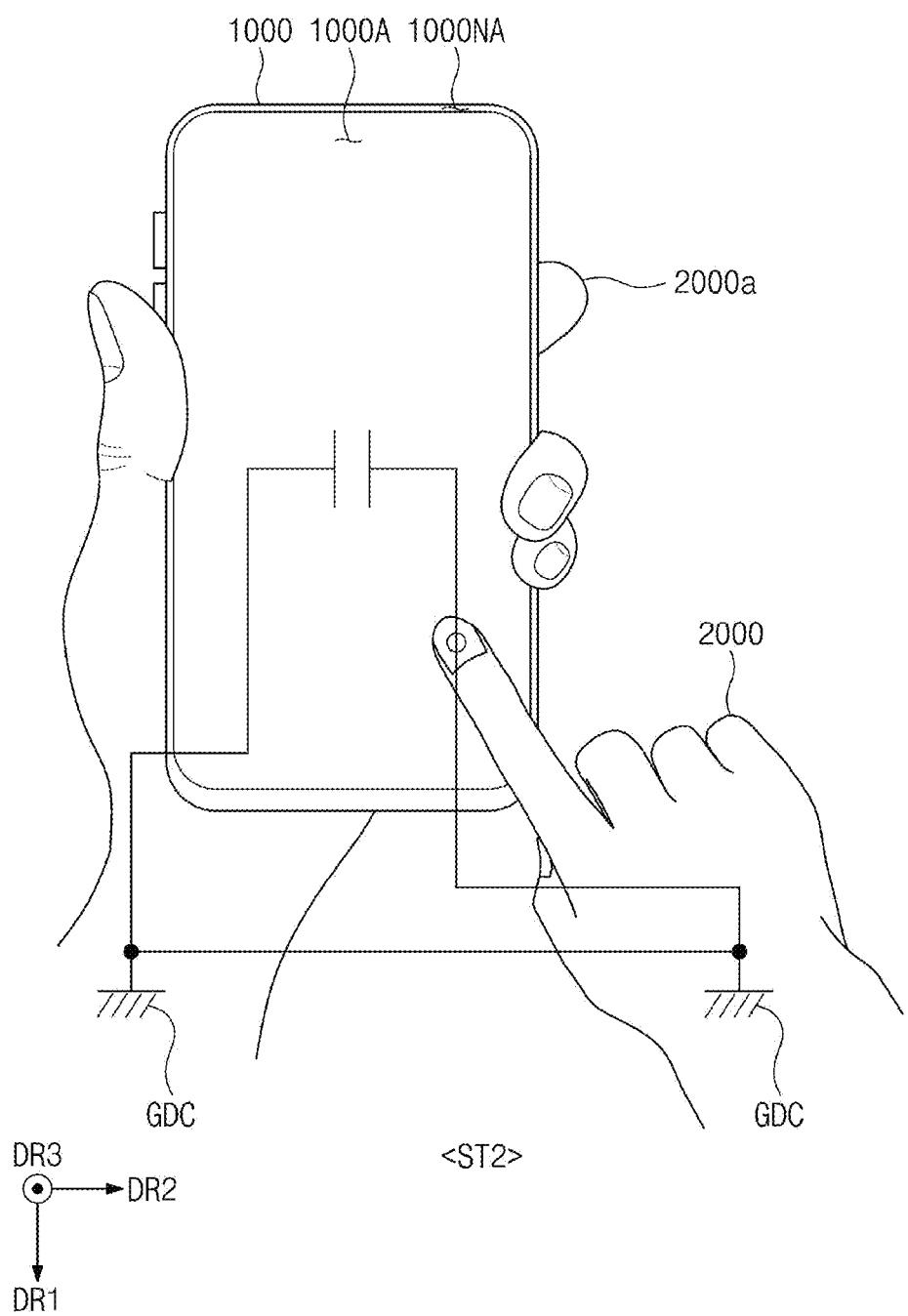
FIG. 1B is a diagram illustrating a use state of an electronic device, according to an embodiment of the present disclosure.

FIG. 1A is a diagram illustrating a use state of an electronic device 1000, according to an embodiment of the present disclosure. FIG. 1B is a diagram illustrating a use state of an electronic device 1000, according to an embodiment of the present disclosure.

Referring to FIGS. 1A and 1B, the electronic device 1000 may be a device activated according to an electrical signal. For example, the electronic device 1000 may be a mobile phone, a tablet, or a game console, but is not limited thereto. FIGS. 1A and 1B illustrate that the electronic device 1000 is a mobile phone.

An active area 1000A and a peripheral area 1000NA may be provided in the electronic device 1000. The electronic device 1000 may display an image through the active area 1000A. The active area 1000A may include a surface extended in a first direction DR1 and a second direction DR2. The peripheral area 1000NA may surround the active area 1000A.

A thickness direction of the electronic device 1000 may be parallel to a third direction DR3 intersecting the first direction DR1 and the second direction DR2. Accordingly, front surfaces (or upper surfaces) and back surfaces (or lower surfaces) of members constituting the electronic device 1000 may be defined with respect to the third direction DR3.

The electronic device 1000 may detect inputs applied from the outside. For example, the electronic device 1000 may detect a passive input by a touch 2000. The touch 2000 may include all input means capable of providing a change in capacitance, such as a user's body or a passive pen. However, an embodiment is not limited thereto. For example, the electronic device 1000 may also detect an input by an active-type input means (e.g., an active pen) that provides a driving signal.

A first use state ST1 (or a first state) shown in FIG. 1A may be a state where the electronic device 1000 is touched with only one hand. The first use state ST1 may be a state where the electronic device 1000 is manipulated in a non-grip state (e.g., a state where the electronic device 1000 is positioned on a table or a stationary object). In this case, a ground GD1 of the electronic device 1000 and a ground GD2 of a user providing the touch 2000 may be separated from each other. The electronic device 1000 may not have a sufficient ground state in the first use state ST1.

A second use state ST2 (or a second state) shown in FIG. 1B may be a state where the electronic device 1000 is gripped by the user (2000a) and the touch 2000 is provided. FIG. 1B illustrates both hands are used in manipulating the electronic device 1000, but an embodiment is not limited thereto. For example, a case where the touch 2000 is provided by using a finger of the gripped hand in a state of gripping the electronic device 1000 with one hand may be seen as being in the second use state ST2. In this case, a ground GDC of the electronic device 1000 and the ground GDC of a user providing the touch 2000 may have a common ground state, and the electronic device 1000 and the user may be connected to the ground. Accordingly, the electronic device 1000 may have a sufficient ground state in the second use state ST2.

The first use state ST1 may result in a low ground mass (LGM) state. The second use state ST2 may result in a high ground mass (HGM) state.

Figure 2A:
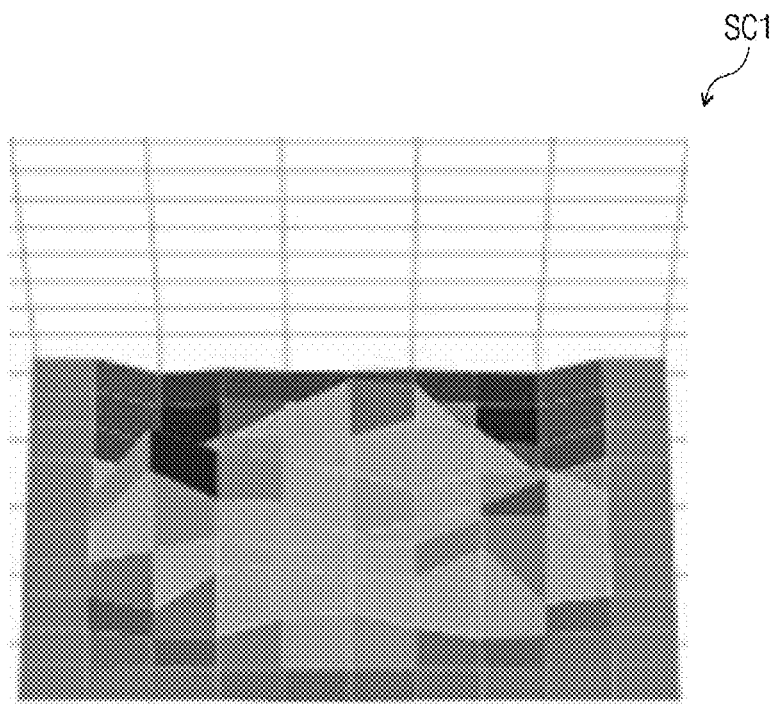
FIG. 2A is a diagram illustrating a sample of a signal obtained in the use state of FIG. 1A.
Figure 2B:
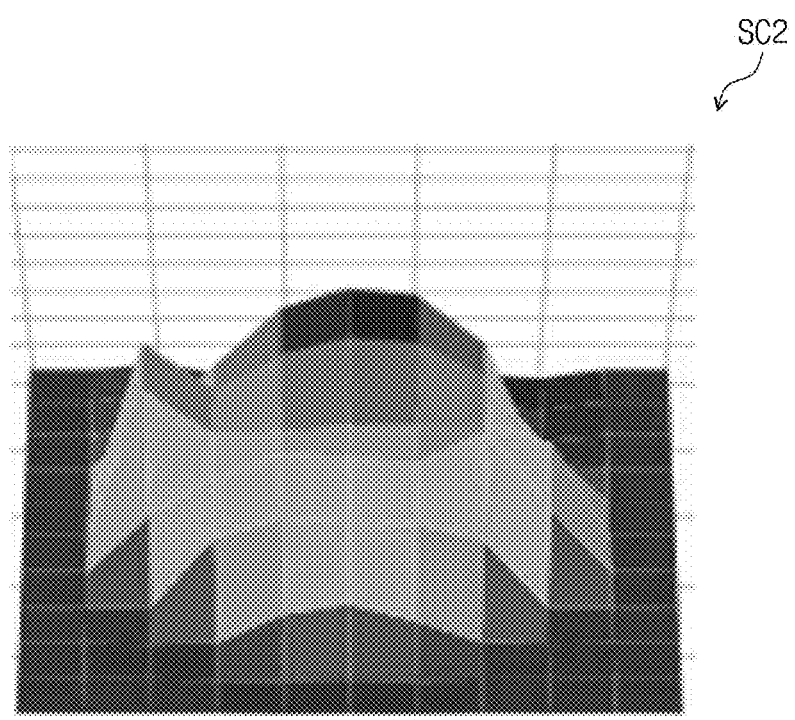
FIG. 2B is a diagram illustrating a sample of a signal obtained in the use state of FIG. 1B.

FIG. 2A is a diagram illustrating a sample of a signal SC1 obtained in the use state of FIG. 1A. FIG. 2B is a diagram illustrating a sample of a signal SC2 obtained in the use state of FIG. 1B.

Referring to FIGS. 1A and 2A, the ground GD1 of the electronic device 1000 and the ground GD2 of a user providing the touch 2000 are different from each other. Accordingly, a signal for detecting a change in capacitance may be unstable. A signal SC1 obtained in the first use state ST1 may have a waveform whose center (or peak) is concave, depending on a contact area of the touch 2000 and/or a method of the touch 2000. Referring to a sample of the signal SC1 obtained in the first use state ST1, a signal peak is distributed to the periphery while the center of a signal is concave. In this case, each peak is mistakenly recognized as a separate signal, and thus the accuracy of touch coordinates may be reduced.

Referring to FIGS. 1B and 2B, the ground GDC of the electronic device 1000 is common with the ground GDC of the user providing the touch 2000. Accordingly, referring to the sample of a signal SC2 obtained in the second use state ST2, it is seen that the peak of the signal SC2 toward the center is clear.

According to an embodiment of the present disclosure, as in the signal SC2 obtained in the second use state ST2, the signal SC1 obtained in the first use state ST1 may be restored such that the peak of the signal is clear. In other words, the signal SC1 obtained in the first use state ST1 may be restored to have a clear peak, similar to the signal SC2 obtained in the second use state ST2. For example, the signal SC1 obtained in the first use state ST1 may be restored by using a two-dimensional (2D) normal distribution waveform. The peak of the restored signal may be clear. By stabilizing the position of the signal, the positioning accuracy can be improved. Furthermore, according to an embodiment of the present disclosure, since the signal restoration is solely based on mutual capacitance signal data, it simplifies a coordinate calculation algorithm. This will be more fully detailed later.

FIG. 3 is a block diagram of an electronic device 1000, according to an embodiment of the present disclosure.

Referring to FIG. 3, the electronic device 1000 may include a display panel 100, a sensor 200, a display driver 100C, and a main driver 1000C. The sensor 200 may include a sensor layer 200L and a sensor driver 200C.

The display panel 100 may be a configuration that substantially generates an image. The display panel 100 may be a light emitting display layer. For example, the display panel 100 may be an organic light emitting display layer, an inorganic light emitting display layer, an organic-inorganic light emitting display layer, a quantum dot display layer, a micro-light emitting diode (LED) display layer, or a nano-LED display layer.

The sensor layer 200L may be disposed on the display panel 100. The sensor layer 200L may sense an external input applied from the outside. The external input may include any input means capable of providing a change in capacitance. For example, the sensor layer 200L may sense not only a passive-type input means such as a user's body, but also an input by an active-type input means that provides a driving signal.

The main driver 1000C may control overall operations of the display device 1000. For example, the main driver 1000C may control operations of the display driver 100C and the sensor driver 200C. The main driver 1000C may include at least one microprocessor and may further include a graphics controller. The main driver 1000C may be referred to as an "application processor", "central processing unit", or "main processor".

The display driver 100C may drive the display panel 100. The display driver 100C may receive image data RGB and a control signal D-CS from the main driver 1000C. The control signal D-CS may include various signals. For example, the control signal D-CS may include an input vertical synchronization signal, an input horizontal synchronization signal, a main clock, and a data enable signal. The display driver 100C may generate a vertical synchronization signal and a horizontal synchronization signal for controlling timing for providing a signal to the display panel 100, based on the control signal D-CS.

The sensor driver 200C may drive the sensor layer 200L. The sensor driver 200C may receive a control signal I-CS from the main driver 1000C. The control signal I-CS may include a clock signal. The sensor driver 200C may calculate coordinate information of an input based on a signal received from the sensor layer 200L and may provide the main driver 1000C with a coordinate signal I-SS having the coordinate information. The main driver 1000C executes an operation corresponding to a user input based on the coordinate signal I-SS. For example, the main driver 1000C may operate the display driver 100C to display a new application image on the display panel 100.

Figure 4:
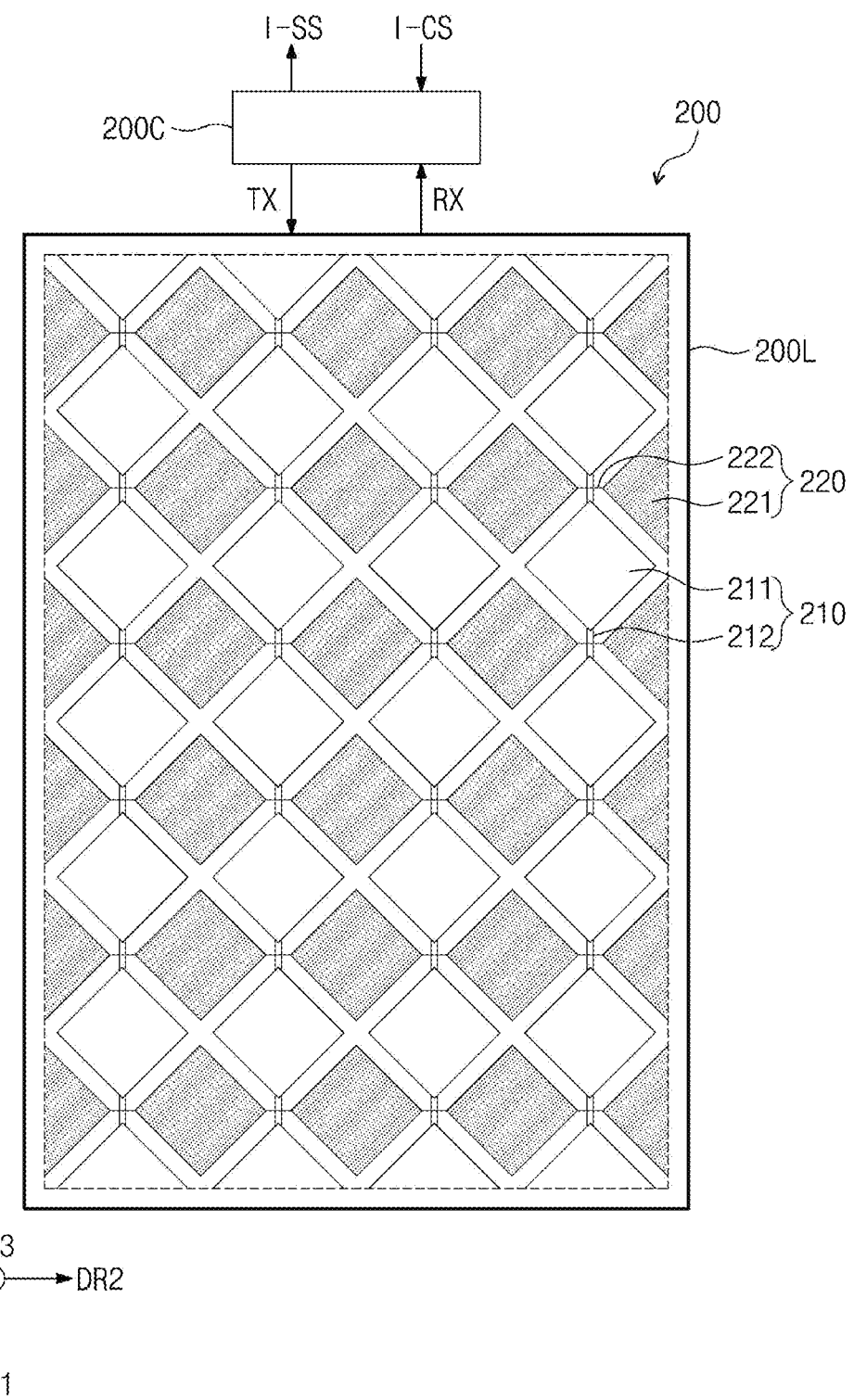
FIG. 4 is a diagram illustrating a sensor, according to an embodiment of the present disclosure.

FIG. 4 is a diagram illustrating the sensor 200, according to an embodiment of the present disclosure.

Referring to FIG. 4, the sensor layer 200L may include a plurality of first electrodes 210 and a plurality of second electrodes 220. Each of the first electrodes 210 may extend in the first direction DR1. The first electrodes 210 may be spaced from each other in the second direction DR2. Each of the second electrodes 220 may extend in the second direction DR2. The second electrodes 220 may be spaced from each other in the first direction DR1. The first electrodes 210 may intersect the second electrodes 220. The sensor layer 200L may further include a plurality of trace lines respectively connected to the plurality of first electrodes 210 and the plurality of second electrodes 220.

Each of the first electrodes 210 may include sensing patterns 211 and bridge patterns 212. The two sensing patterns 211 adjacent to each other may be electrically connected to each other by the two bridge patterns 212, but are not particularly limited thereto. The sensing pattern 211 and the bridge patterns 212 may be disposed on different layers from each other.

Each of the second electrodes 220 may include a first portion 221 and a second portion 222. The first portion 221 and the second portion 222 may have integral shapes with each other and may be disposed on the same layer. For example, the first portion 221 and the second portion 222 may be disposed on the same layer as the sensing pattern 211. The two bridge patterns 212 may be intersected with the second portion 222 in an insulation scheme.

The sensor driver 200C may receive the control signal I-CS from the main driver 1000C (see FIG. 3). The sensor driver 200C may provide the coordinate signal I-SS to the main driver 1000C. The sensor driver 200C may be implemented as an integrated circuit (IC). The sensor driver 200C having an IC type may be directly mounted in a predetermined area of the sensor layer 200L or may be mounted on a separate printed circuit board in a chip on film (COF) scheme, and then may be electrically connected to the sensor layer 200L.

The sensor driver 200C may output transmission signals TX to the first electrodes 210 and may receive sensing signals RX from the second electrodes 220. However, an embodiment is not limited thereto. For example, the sensor driver 200C may output transmission signals TX to the second electrodes 220 and may receive sensing signals RX from the first electrodes 210.

Figure 5:
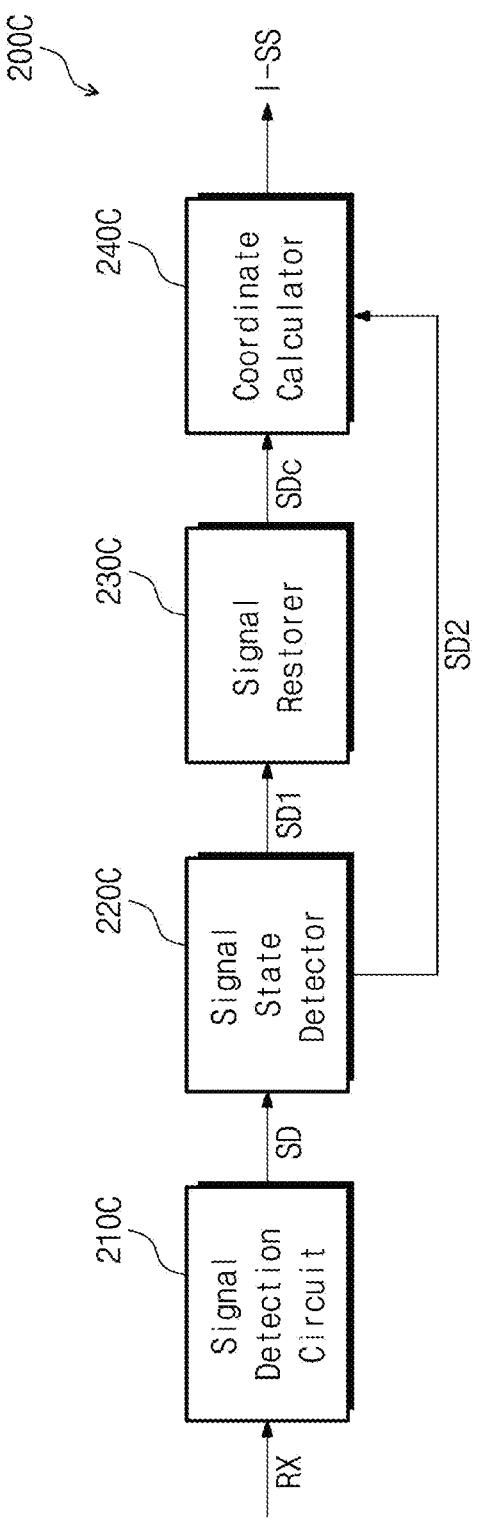
FIG. 5 is a block diagram of a sensor driver, according to an embodiment of the present disclosure.

FIG. 5 is a block diagram of the sensor driver 200C, according to an embodiment of the present disclosure.

Referring to FIGS. 4 and 5, the sensor driver 200C may include a signal detection circuit 210C, a signal state detector 220C, a signal restorer 230C, and a coordinate calculator 240C. Each of the signal state detector 220C, the signal restorer 230C, and the coordinate calculator 240C may be implemented as a circuit like the signal detection circuit 210C.

The signal detection circuit 210C may convert the sensing signal RX received from the sensor layer 200L into data SD. The signal detection circuit 210C may include an analog front end. The sensing signal RX may be an analog signal, and the data SD may be a digital signal.

The signal state detector 220C may detect a state of the sensing signal RX based on the data SD. For example, the signal state detector 220C may detect whether the sensing signal RX is a weak signal. In other words, the signal state detector 220C identifies whether the sensing signal RX is a weak signal. A criterion for determining whether the sensing signal RX is a weak signal may be applied in various ways.

In an embodiment of the present disclosure, the signal state detector 220C may calculate at least one boundary value (or a threshold value) from a statistical value obtained from raw data obtained by measuring a mutual capacitance between the first electrode 210 and the second electrode 220. The statistical value may include at least one of an average value, a maximum value, a minimum value, and a standard deviation of the raw data.

The signal state detector 220C may determine the state of the data SD by comparing the at least one boundary value and the data SD. The signal state detector 220C may determine the state of the data SD by considering various factors such as a signal-to-noise ratio of the data SD, a maximum value of the data SD, a minimum value of the data SD, the distribution of an average value, and sensing shape, and boundary values of several species calculated through the comparison with the statistical value. In other words, the signal state detector 220C may detect whether the data SD is a weak signal by comparing the at least one boundary value with the data SD.

The signal state detector 220C may store default statistical values obtained from a plurality of samples in advance. Accordingly, the initial data SD may determine the state by using the default statistical values. The at least one boundary value may be periodically updated. A period at which the at least one boundary value is updated may be set in various ways. For example, the at least one boundary value may be updated whenever it is determined that the data SD is not a weak signal, or the at least one boundary value may be updated at specific time intervals.

The statistical value may be one statistical value obtained from the whole sensor layer 200L, but is not particularly limited thereto. For example, the sensor layer 200L may be divided into a plurality of areas, and statistical values may be obtained from the plurality of areas, respectively. Accordingly, the plurality of statistical values respectively corresponding to the plurality of areas may be classified and stored for each of the plurality of areas.

In an embodiment of the present disclosure, the signal state detector 220C may be configured to determine the state of the data SD by using artificial intelligence-based image recognition and classification technology.

The signal restorer 230C may output restoration data SDc by restoring the data SD according to the state of the sensing signal RX. For example, when the data SD is data SD1 of a first state corresponding to the signal SC1 shown in FIG. 2A, the signal restorer 230C may output the restoration data SDc by restoring the data SD1. Moreover, when the data SD is data SD2 of a second state corresponding to the signal SC2 shown in FIG. 2B, the data SD2 may be provided to the coordinate calculator 240C.

The signal restorer 230C may restore the data SD1 to the restoration data SDc by using a 2D normal distribution waveform. The peak of the restored signal corresponding to the restoration data SDc may be clear. Accordingly, the position of the peak may be stabilized, and the positional accuracy may be improved.

According to an embodiment of the present disclosure, to restore a weak signal, the signal may be restored only with the mutual capacitance signal data, without using a self-capacitance signal. Accordingly, a coordinate calculation algorithm of the sensor 200 may be simplified. In addition, because the self-capacitance signal is not generated in the restoration of a signal, hardware for sensing self-capacitance in the sensor 200 may be omitted. Moreover, with respect to a comparative example using a self-capacitance signal for restoring a signal, because the present disclosure uses only the mutual capacitance signal to restore the signal, signal restoration delay may be improved by reducing a sensing driving time.

The coordinate calculator 240C may calculate coordinates based on the data SD2 or the restoration data SDc. The coordinate calculator 240C may generate the coordinate signal I-SS having coordinate information.

Figure 6:
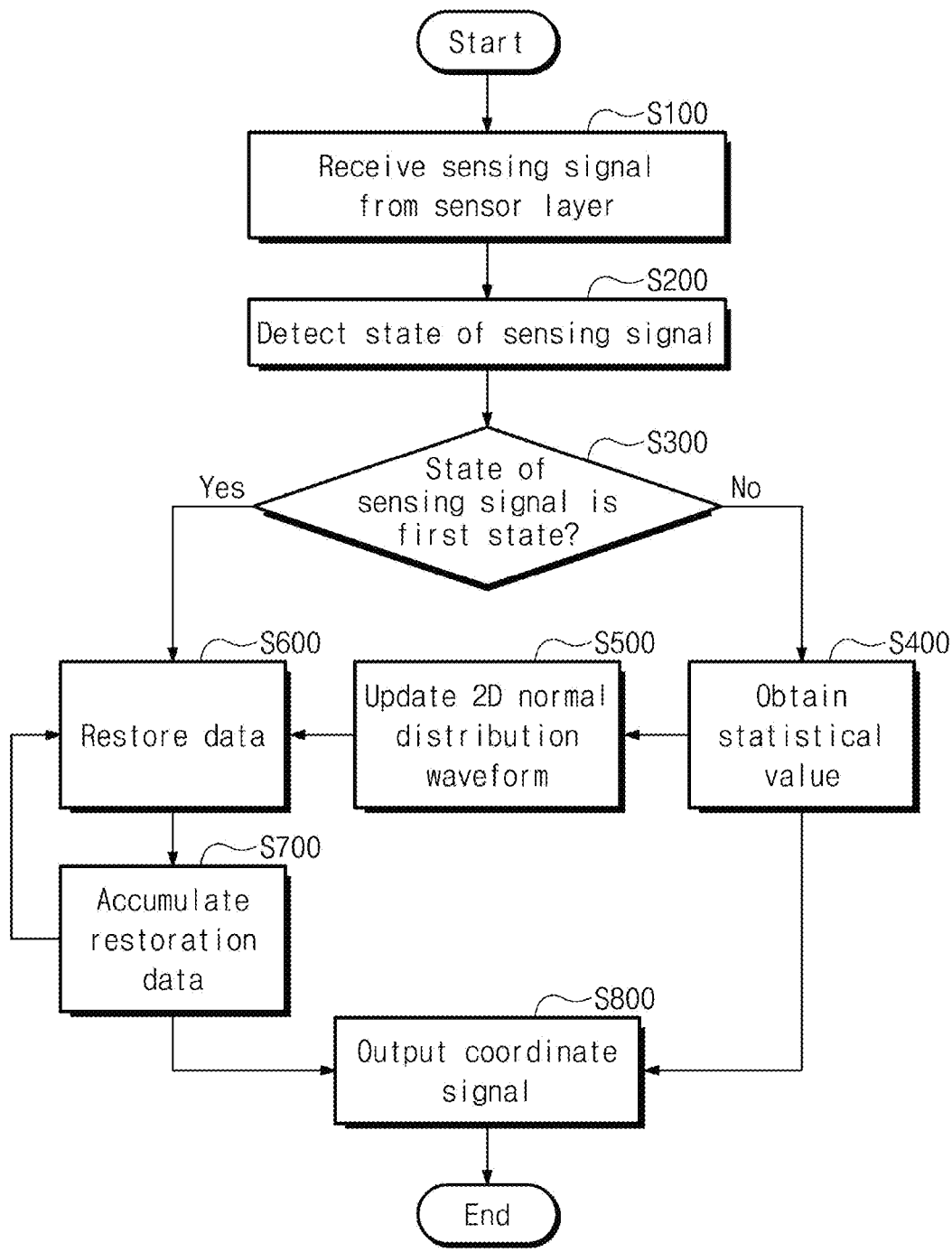
FIG. 6 is a flowchart for describing a method of driving a sensor.

FIG. 6 is a flowchart for describing a method of driving the sensor 200 (see FIG. 4).

Referring to FIGS. 5 and 6, the sensor driver 200C receives the sensing signal RX from the sensor layer 200L (S100). The signal state detector 220C detects a state of the sensing signal RX (S200). The signal state detector 220C may determine whether the state of the sensing signal RX is a first state (S300).

When the state of the sensing signal RX is a second state, the sensor driver 200C may obtain a statistical value from the data SD2 (S400). The data SD2 may be data obtained by digitally converting the second state sensing signal RX. The sensor driver 200C may update a 2D normal distribution waveform from the statistical value (S500). Alternatively, the sensor driver 200C may obtain the data SD2 as learning data.

When the signal state detector 220C determines that the state of the sensing signal RX is the first state (e.g., a weak signal), the acquisition and update of the statistical value may be temporarily stopped, and the following restoration operation may be performed.

When the state of the sensing signal RX is the first state, the signal restorer 230C may perform an operation of restoring the data SD1 (S600). The signal restorer 230C may restore the data SD1 of the first state by using the 2D normal distribution waveform. The restoration data SDc obtained by restoring the data SD1 may be accumulated in the signal restorer 230C (S700). The accumulation of the restoration data SDc may be updated every time restoration data SDc is obtained. The restoration data SDc accumulated in the past may be used when the data SD1 of the first state is restored.

The accumulated restoration data SDc may be erased in a specific state and may be renewed again. For example, when a difference between previously accumulated restoration data SDc and new restoration data SDc increases, the previously accumulated restoration data SDc may be erased and may be renewed again. Alternatively, when the use state of the electronic device 1000 changes from the first use state ST1 (see FIG. 1A) to the second use state ST2 (see FIG. 1B), the accumulated restoration data SDc may be erased.

The coordinate calculator 240C may calculate coordinates based on the restoration data SDc and may output the coordinate signal I-SS with information about the coordinates (S800). Moreover, when the state of the sensing signal RX is the second state, the coordinate calculator 240C may calculate coordinates based on the data SD2 and may output the coordinate signal I-SS having information about the coordinates (S800).

Figure 7:
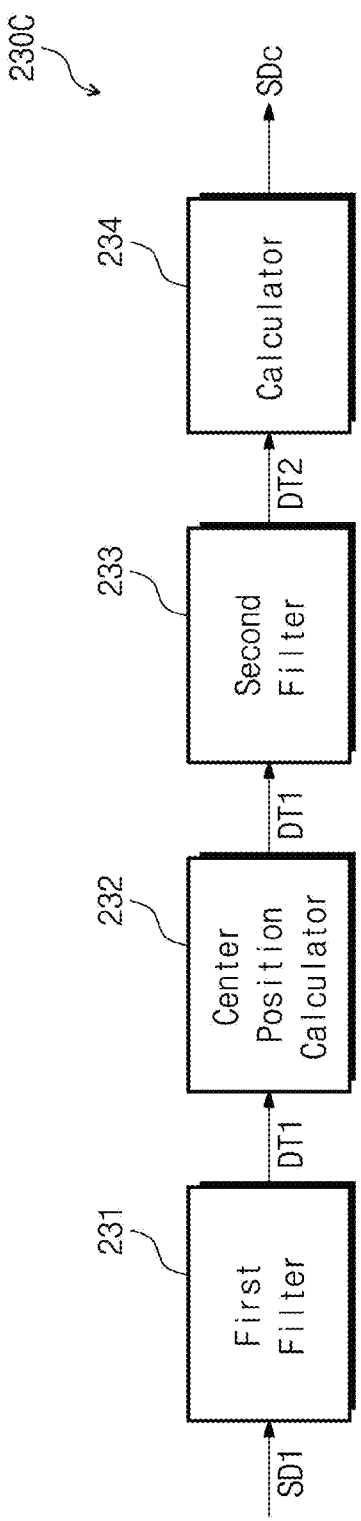
FIG. 7 is a block diagram of a signal restorer, according to an embodiment of the present disclosure.
Figure 8:
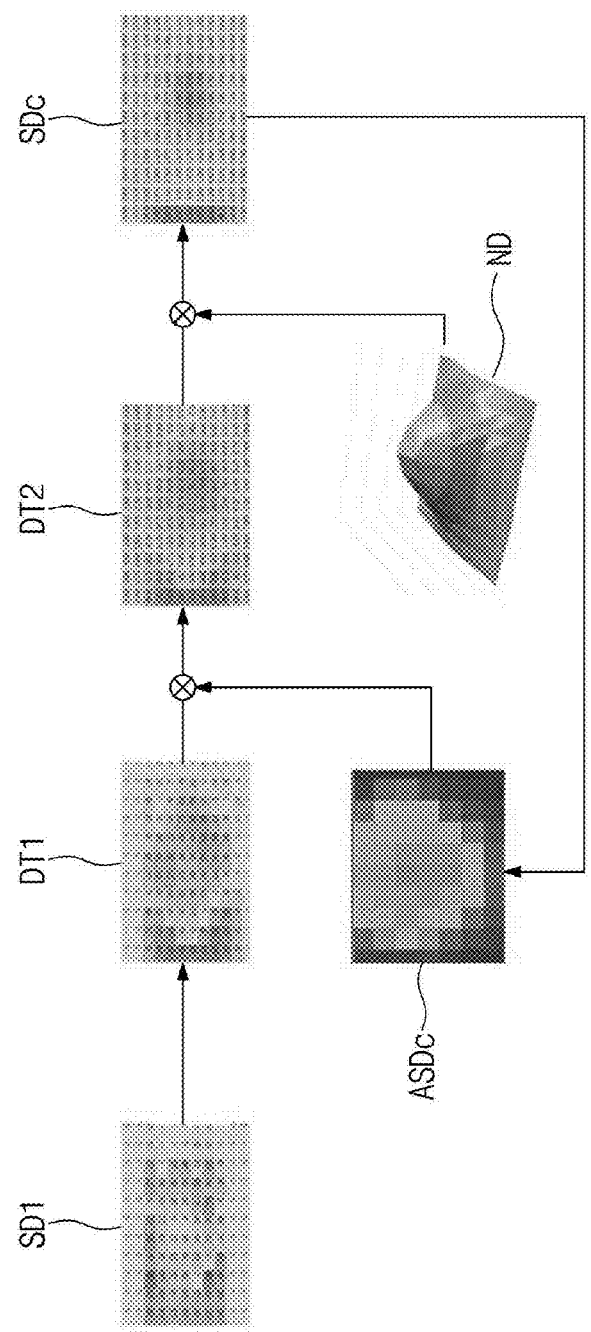
FIG. 8 is a diagram for describing signal restoration, according to an embodiment of the present disclosure.

FIG. 7 is a block diagram of the signal restorer 230C, according to an embodiment of the present disclosure. FIG. 8 is a diagram for describing signal restoration, according to an embodiment of the present disclosure.

Referring to FIGS. 7 and 8, the signal restorer 230C may include a first filter 231, a center position calculator 232, a second filter 233, and a calculator 234. In this specification, the calculator may also be referred to as a calculating part, a calculating unit, a calculating circuit, a function part, or an operator part.

The first filter 231 may generate first intermediate data DT1 by removing noise from the data SD1. Compared to a normal signal, a weak signal tends to have a low center signal and a high peripheral signal. Moreover, the data SD1 also has a deviation or is biased toward a specific location. Accordingly, filter processing may be performed on the whole data SD1. For example, the data SD1 may be averaged using surrounding data. In this case, unnecessary noise may be removed from the data SD1, and it may be easy to calculate a center position to be described later.

The center position calculator 232 may calculate the center position from the first intermediate data DT1. The restoration of a weak signal refers to restoring the weak signal such that the center of the weak signal has a peak value, similar to the signal of a normal state. Accordingly, the weak signal may be restored by matching the center of a 2D normal distribution waveform ND with the data SD1 to be restored. The center position of the first intermediate data DT1 may be calculated in a method of calculating a boundary value from a weak signal state and determining a center position by identifying a shape under a boundary condition. This process involves determining the boundary value based on a weak signal state and utilizing it to identify the center position of the first intermediate data DT1.

The second filter 233 may generate second intermediate data DT2 by reflecting an accumulation value ASDc to the first intermediate data DT1. The accumulation value ASDc may be data obtained by accumulating restoration data SDc obtained in the past. The second filter 233 may be an infinite impulse response (IIR) time filter. The second filter 233 may output the second intermediate data DT2 by mixing the first intermediate data DT1 and the accumulation value ASDc at a predetermined ratio. The predetermined ratio may be "a:(1-a)", and the 'a' may be a value that is not less than '0' and is not greater than 0.9.

Second intermediate data=first intermediate data*$a$+ accumulation value*(1-$a$).

The accumulation value ASDc may be updated at every restoration. When the accumulation value ASDc is reflected to the first intermediate data DT1, the center position according to a temporal change (e.g., a movement amount) of a signal waveform may be corrected. For example, the signal restorer 230C may store the center position of a past signal and the temporal change of the past signal as vector information. Accordingly, the center position may be calculated in consideration with not only a current signal, but also a past position change. In other words, when the past position change is tracked together, coordinate precision may be increased, and the center position may be corrected depending on the temporal change of signal movement.

The calculator 234 may generate the restoration data SDc by calculating the 2D normal distribution waveform ND with the second intermediate data DT2. In other words, the shape of the second intermediate data DT2 may be restored by matching a center position of the pre-processed weak signal with a center position of the 2D normal distribution waveform ND and multiplying the weak signal and the 2D normal distribution waveform ND. In other words, the calculator 234 may generate the restoration data SDc by matching the center position of the second intermediate data DT2 with the center position of the 2D normal distribution waveform ND and multiplying the second intermediate data DT2 and the 2D normal distribution waveform ND.

The data SD1 may be restored to the restoration data SDc by reflecting the accumulation value ASDc of a time direction as well as the 2D normal distribution waveform ND having an ideal signal peak. In other words, before restoration is performed by using the 2D normal distribution waveform ND, the first intermediate data DT1 may be converted to the second intermediate data DT2 by using the accumulation value ASDc. Accordingly, since the accumulation value ASDc is reflected to the first intermediate data DT1 in advance, sudden noise may be mostly removed, thereby enhancing the stability of the restoration data SDc.

Figure 9:
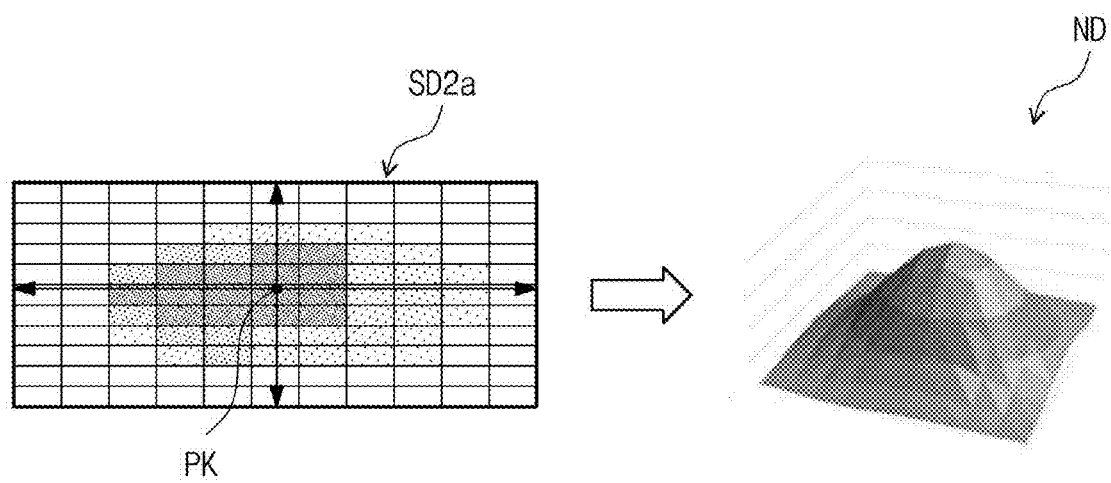
FIG. 9 is a diagram for describing a method of generating a two-dimensional (2D) normal distribution waveform, according to an embodiment of the present disclosure.

FIG. 9 is a diagram for describing a method of generating the 2D normal distribution waveform ND, according to an embodiment of the present disclosure.

Referring to FIGS. 8 and 9, a state of the sensing signal RX (see FIG. 4) is divided into a first state requiring restoration and a second state not requiring restoration. The 2D normal distribution waveform ND may be generated by the sensing signal RX of the second state. The 2D normal distribution waveform ND may be used to correct a signal sample shape, signal strength, or the like.

A statistical value may be obtained from the sensing signal RX of the second state. The statistical value may include a standard deviation, a maximum peak, and an average value. The maximum range and minimum range of the sensing signal RX of the second state may be calculated. Afterward, the sensing signal RX of the second state is quantized such that the maximum range is equal to a size of the window to be restored (e.g., the size of the data SD1 of the first state). A variance ($\sigma x^2$, $\sigma y^2$) in x and y directions may be calculated based on an average u and a peak PK in quantized 2D data SD2a. Afterward, the 2D normal distribution waveform ND is generated by using the obtained average u and the variance ($\sigma x^2$, $\sigma y^2$) of x and y directions, and the following equation.

$$f(\vec{x}) = \frac{1}{\sqrt{(2\pi)^n |\Sigma|}} \exp\left\{-\frac{1}{2}(\vec{x}-\vec{\mu})_t \sum\nolimits^{-1}(\vec{x}-\vec{\mu})\right\}.$$

(n=2, covariance matrix $\Sigma$="[[$\sigma x^2$, $\sigma xy$], [$\sigma xy$, $\sigma y^2$]]", $\sigma xy$: covariance of xy).

In an embodiment of the present disclosure, to minimize the variance of a signal peak, the 2D normal distribution waveform ND may use a calculation result obtained by correcting the covariance matrix.

The 2D normal distribution waveform ND may be one 2D normal distribution waveform ND obtained from the whole sensor layer 200L, but is not particularly limited thereto. For example, the sensor layer 200L may be divided into a plurality of areas, and the 2D normal distribution waveform ND may be obtained from the plurality of areas. Accordingly, a plurality of 2D normal distribution waveforms ND respectively corresponding to the plurality of areas may be classified and stored for each of the plurality of areas.

Figure 10:
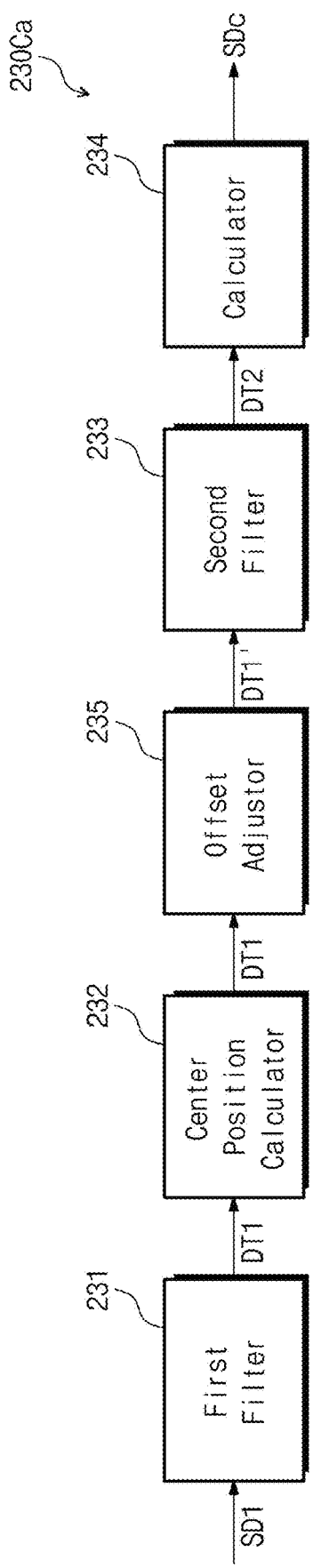
FIG. 10 is a block diagram of a signal restorer, according to an embodiment of the present disclosure.

FIG. 10 is a block diagram of a signal restorer 230Ca, according to an embodiment of the present disclosure. In the description of FIG. 10, the same reference numerals are assigned to the same components described with reference to FIG. 5, and thus the descriptions thereof are omitted to avoid redundancy.

Referring to FIG. 10, the signal restorer 230Ca may further include an offset adjustor 235. The offset adjustor 235 may adjust an offset of the first intermediate data DT1 and then may provide a 1-1st intermediate data DT1' to the second filter 233.

The data SD1 may be a weak signal and may include a negative value. The offset adjustor 235 may be provided such that an abnormal value is not reflected when the abnormal value such as a negative value is restored. Various methods may be applied as a method for adjusting the offset. For example, a boundary value (or a threshold value) may be calculated from a signal to be corrected or the first intermediate data DT1, and the correction may be performed on a signal of which the level is less than the threshold value. In other words, a boundary value or threshold value can be calculated based on the signal to be corrected or the first intermediate data DT1. Subsequently, the correction process can be applied to a signal with a level lower than the threshold value. For example, an offset value may be added to the signal of which the level is less than the threshold value. The offset value may be calculated from the minimum value of the signal. For example, the offset value may be twice the absolute value of the minimum value of the signal, but is not particularly limited thereto.

Figure 11:
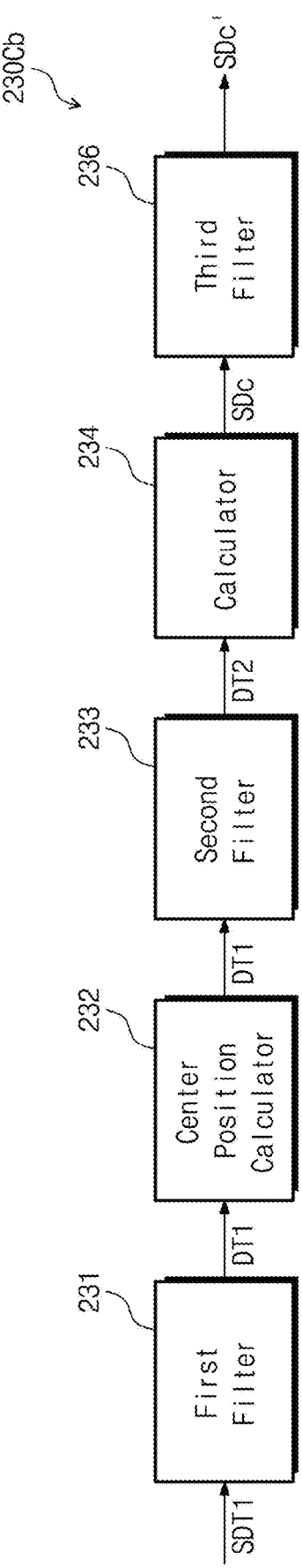
FIG. 11 is a block diagram of a signal restorer, according to an embodiment of the present disclosure.

FIG. 11 is a block diagram of a signal restorer 230Cb, according to an embodiment of the present disclosure. In the description of FIG. 11, the same reference numerals are assigned to the same components described with reference to FIG. 5, and thus the descriptions thereof are omitted to avoid redundancy.

Referring to FIG. 11, the signal restorer 230Cb may further include a third filter 236. The third filter 236 may remove noise of the restoration data SDc by using a peripheral signal for the restoration data SDc and may output post-processing restoration data SDc'. For example, the third filter 236 may be a blur filter.

Figure 12A:
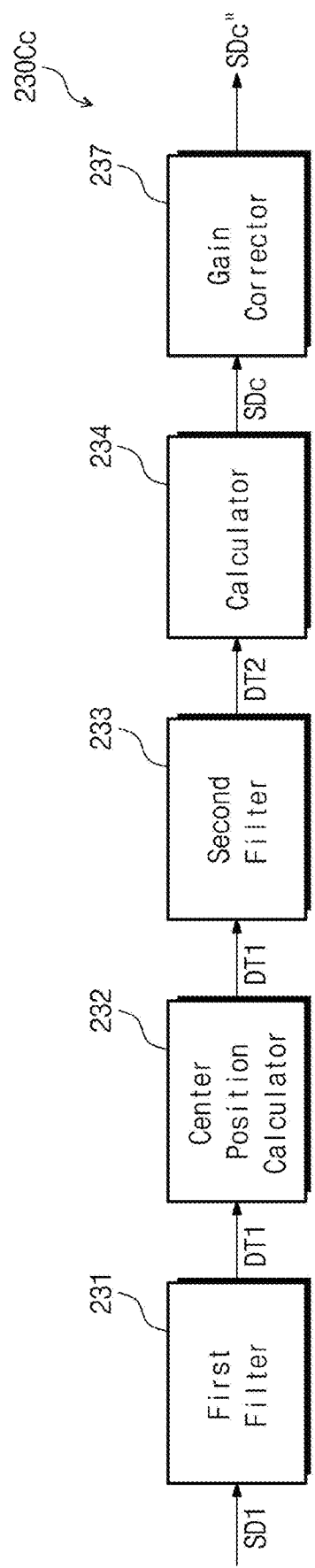
FIG. 12A is a block diagram of a signal restorer, according to an embodiment of the present disclosure.
Figure 12B:
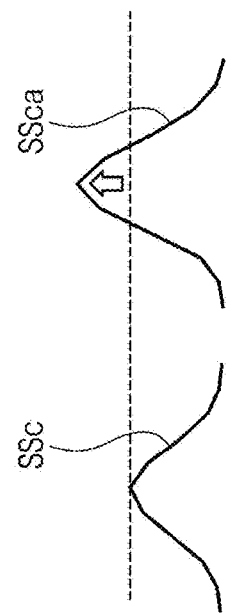
FIG. 12B is a diagram for describing gain adjustment of restoration data, according to an embodiment of the present disclosure.

FIG. 12A is a block diagram of a signal restorer 230Cc, according to an embodiment of the present disclosure. FIG. 12B is a diagram for describing gain adjustment of restoration data, according to an embodiment of the present disclosure. In the description of FIG. 12A, the same reference numerals are assigned to the same components described with reference to FIG. 5, and thus the descriptions thereof are omitted to avoid redundancy.

Referring to FIGS. 12A and 12B, the signal restorer 230Cc may further include a gain corrector 237.

The gain corrector 237 may compare a signal range of a restored first signal SSc and the maximum value of the accumulated signal of a second state. When the restored signal SSc is less than a past statistical value (e.g., when SSc is below the dashed line in FIG. 12B), the gain corrector 237 may correct the restored first signal SSc to a second signal SSca having an expected level. In other words, the second signal SSca is a signal obtained by additionally reflecting range correction to the first signal SSc.

Figure 13:
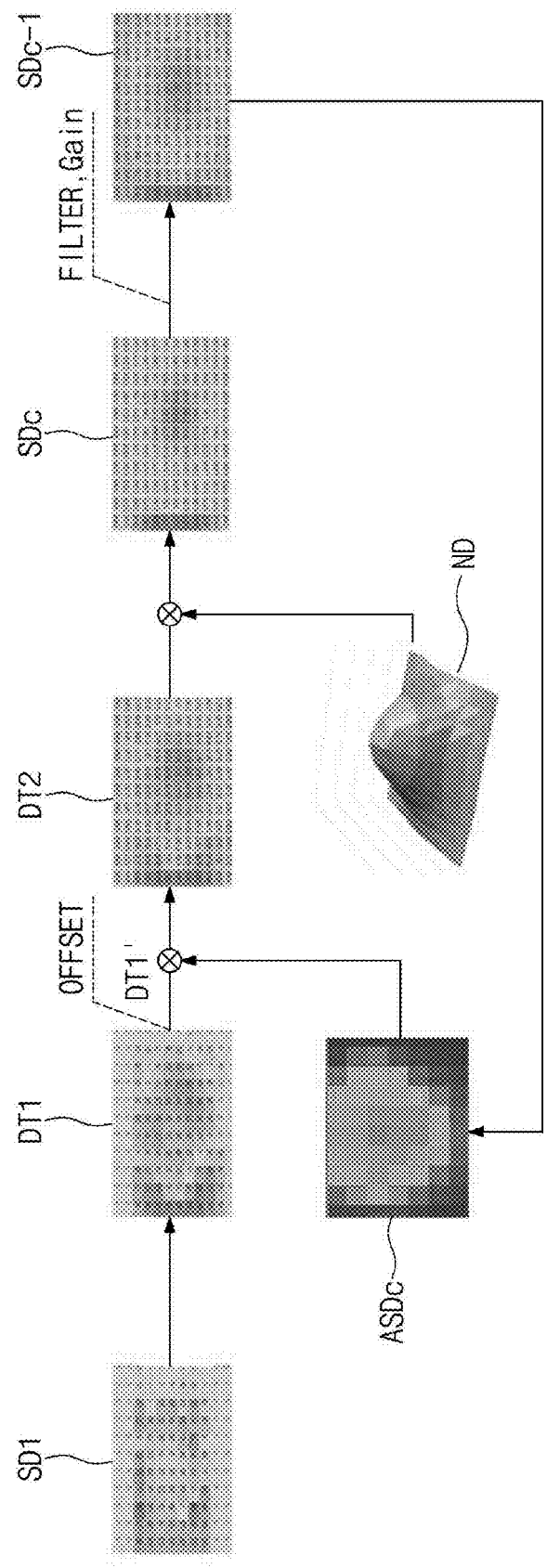
FIG. 13 is a diagram for describing signal restoration, according to an embodiment of the present disclosure.

FIG. 13 is a diagram for describing signal restoration, according to an embodiment of the present disclosure.

Referring to FIGS. 5, 7, 10, 11, 12A, and 13, signal restoration is described when the signal restorer 230C includes the first filter 231, the center position calculator 232, the second filter 233, the calculator 234, the offset adjustor 235, the third filter 236, and the gain corrector 237.

The first filter 231 may generate first intermediate data DT1 by removing noise from the data SD1.

When the offset of the first intermediate data DT1 needs to be adjusted, the offset adjustor 235 may adjust an offset of the first intermediate data DT1 and may generate the 1-1st intermediate data DT1'.

The second filter 233 may generate the second intermediate data DT2 by reflecting an accumulation value ASDc to the 1-1st intermediate data DT1'. The calculator 234 may generate the restoration data SDc by calculating the 2D normal distribution waveform ND with the second intermediate data DT2.

When it is determined that noise removal of the restoration data SDc is additionally required, the third filter 236 may remove noise of the restoration data SDc by using a peripheral signal for the restoration data SDc and may output post-processing restoration data SDc'.

When it is determined that range correction of the restoration data SDc is required, the gain corrector 237 may correct the range of the restoration data SDc and may output post-processing restoration data SDc". The post-processing restoration data SDc' and SDC" may be accumulated as the accumulation value ASDc.

The coordinate calculator 240C may calculate coordinates based on the data SD2 or the post-processing restoration data SDc' and SDC". The coordinate calculator 240C may generate the coordinate signal I-SS having coordinate information.

Figure 14A:
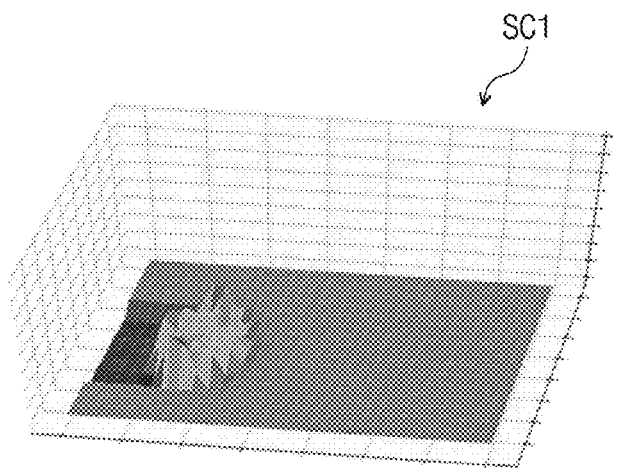
FIG. 14A is a diagram illustrating a sample of a signal in a first state.
Figure 14B:
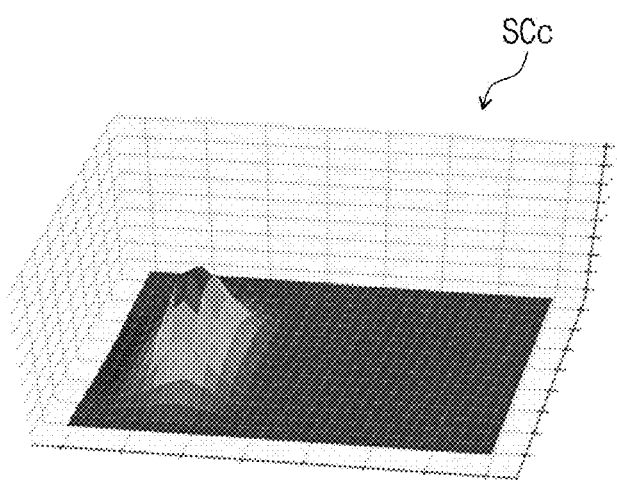
FIG. 14B is a diagram illustrating a sample of a restoration signal.

FIG. 14A is a diagram illustrating a sample of the signal SC1 in a first state. FIG. 14B is a diagram illustrating a sample of a restoration signal SCc.

FIG. 14a is a three dimensional (3D) display of a waveform of the signal SC1 in the first state. FIG. 14B is a 3D display of a waveform of the restoration signal SCc obtained by restoring the signal SC1 in the first state. It may be seen that the signal SC1 having an unclear peak in FIG. 14A is restored to the restoration signal SCc having a waveform with a clear peak in FIG. 14B.

Figure 15A:
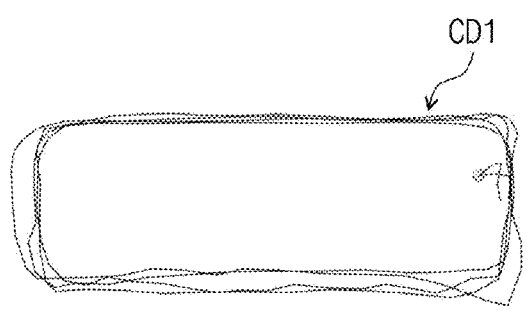
FIG. 15A is a diagram showing a trajectory for coordinates calculated from data that is not restored.
Figure 15B:
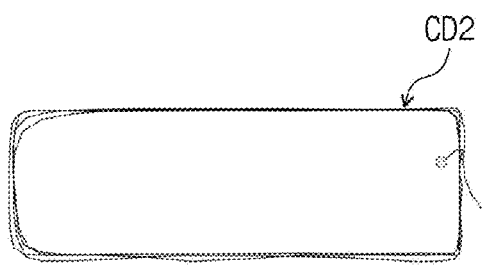
FIG. 15B is a diagram showing a trajectory for coordinates calculated from restored data.

FIG. 15A is a diagram showing a first trajectory CD1 for coordinates calculated from data which is not restored. FIG. 15B is a diagram showing a second trajectory CD2 for coordinates calculated from restored data.

Referring to FIGS. 15A and 15B, comparing the first trajectory CD1 and the second trajectory CD2, it may be seen that the deviation of the trajectory of the second trajectory CD2 is reduced and the precision of the coordinates is improved as compared to the first trajectory CD1.

According to an embodiment of the present disclosure, since a weak signal is restored, the signal-to-noise ratio of an input (e.g., a passive input or an active input) to the sensor layer 200L (see FIG. 4) may be improved. In other words, proximity and hovering detection range may be widened by improving sensing sensitivity.

According to an embodiment of the present disclosure, a sensor may detect a state of a sensing signal. When it is determined that the sensing signal is a weak signal, the sensor may restore the sensing signal such that the peak of the sensing signal is capable of being clarified. For example, the sensor may restore the sensing signal by using a 2-dimensional (2D) normal distribution waveform. The peak of the restored signal may be clear. The position of the signal may be stabilized, thereby improving the positioning accuracy. Since the weak signal is restored, a signal-to-noise ratio of an input entered into the sensor may be improved. Moreover, proximity and hovering detection range may be widened by improving sensing sensitivity. Furthermore, because the sensor restores the signal only with a mutual capacitance signal data, a coordinate calculation algorithm may be simplified.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A sensor comprising:
    a sensor layer including a first electrode and a second electrode;
    a signal detection circuit configured to convert a sensing signal received from the sensor layer into data;
    a signal state detector configured to detect a state of the sensing signal based on the data;
    a signal restorer configured to output restoration data by restoring the data depending on the state of the sensing signal; and
    a coordinate calculator configured to calculate coordinates corresponding to the sensing signal based on the data or the restoration data,
    wherein the signal restorer restores the data into the restoration data by using a 2-dimensional (2D) normal distribution waveform.

2. The sensor of claim 1, wherein the signal restorer includes:
    a first filter configured to generate first intermediate data by removing noise from the data;
    a center position calculator configured to calculate a center position from the first intermediate data;
    a second filter configured to generate second intermediate data by reflecting an accumulation value to the first intermediate data; and
    a calculator configured to generate the restoration data by calculating the 2D normal distribution waveform with the second intermediate data.

3. The sensor of claim 2, wherein the calculator generates the restoration data by matching the second intermediate data with a center position of the 2D normal distribution waveform and multiplying the second intermediate data and the 2D normal distribution waveform.

4. The sensor of claim 2, wherein the second filter is an infinite impulse response (IIR) time filter.

5. The sensor of claim 2, wherein the second filter outputs the second intermediate data by mixing the first intermediate data and the accumulation value at a predetermined ratio.

6. The sensor of claim 5, wherein the predetermined ratio is "a:(1-a)", and the 'a' is a value that is not less than '0' and is not greater than 0.9.

7. The sensor of claim 2, wherein the signal restorer further includes an offset adjustor configured to adjust an offset of the first intermediate data and to provide the adjusted offset to the second filter.

8. The sensor of claim 2, wherein the signal restorer further includes a third filter configured to remove noise from the restoration data by using a peripheral signal for the restoration data.

9. The sensor of claim 2, wherein the signal restorer further includes a gain corrector configured to adjust a gain of the restoration data.

10. The sensor of claim 1, wherein the signal state detector is configured to update a statistical value obtained from raw data, which is obtained by measuring a mutual capacitance between the first electrode and the second electrode.

11. The sensor of claim 10, wherein the statistical value includes an average value of the raw data, a maximum value of the raw data, a minimum value of the raw data, or a standard deviation of the raw data.

12. The sensor of claim 10, wherein the sensor layer is divided into a plurality of areas, and the statistical value is classified and stored for each of the plurality of areas.

13. The sensor of claim 10, wherein the signal state detector is configured to determine a state of the data by comparing the data with at least one boundary value determined based on the statistical value.

14. The sensor of claim 13, wherein the at least one boundary value is updated.

15. The sensor of claim 1, wherein the signal state detector is configured to determine a state of the data by using artificial intelligence-based image recognition and classification technology.

16. The sensor of claim 1, wherein the state of the sensing signal is divided into a first state requiring restoration and a second state not requiring restoration, and the 2D normal distribution waveform is generated by the data of the second state.

17. The sensor of claim 16, wherein a maximum range and a minimum range of the data of the second state are calculated, and the data of the second state is quantized such that the maximum range is equal to a size of the data of the first state, wherein an average u and a variance ($\sigma x^2$, $\sigma y^2$) in x and y directions are calculated in a quantized 2D data, and the 2D normal distribution waveform is generated by using the average $\mu$ and the variance ($\sigma x^2$, $\sigma y^2$) in the x and y directions based on Equation 1:

$$f(\vec{x}) = \frac{1}{\sqrt{(2\pi)^n |\Sigma|}} \exp\left\{-\frac{1}{2}(\vec{x}-\vec{\mu})\Sigma^{-1}(\vec{x}-\vec{\mu})\right\}, \quad [\text{Equation 1}]$$

and wherein, in Equation 1, the 'n' is 2, covariance matrix $\Sigma$ is "[[$\sigma x^2$, $\sigma xy$], [$\sigma xy$, $\sigma y^2$]]", and the $\sigma xy$ is a covariance of 'xy'.

18. The sensor of claim 1, wherein the sensor layer is divided into a plurality of areas, and the 2D normal distribution waveform is classified and stored for each of the plurality of areas.

19. A driving method of a sensor, the method comprising:
converting a received sensing signal into data;
detecting a state of the sensing signal based on the data;
generating restoration data by restoring the data depending on the state of the sensing signal; and
calculating coordinates corresponding to the sensing signal based on the data or the restoration data,
wherein the generating of the restoration data includes:
generating the restoration data by using a two dimensional (2D) normal distribution waveform.

20. The method of claim 19, wherein the generating of the restoration data includes:
generating first intermediate data by removing noise from the data;
calculating a center position from the first intermediate data;
generating second intermediate data by mixing the first intermediate data and an accumulation value at a ratio of "a:(1-a)", wherein 'a' is not less than '0' and is not greater than 0.9; and
matching the second intermediate data with a center position of the 2D normal distribution waveform and multiplying the second intermediate data and the 2D normal distribution waveform to generate the restoration data.

* * * * *